(12) United States Patent
August et al.

(10) Patent No.: US 7,478,240 B1
(45) Date of Patent: Jan. 13, 2009

(54) METHOD AND SYSTEM FOR CAPTURE OF LOCATION SPECIFIC MEDIA RELATED INFORMATION AND DELIVERY THROUGH COMMUNICATIONS NETWORK

(75) Inventors: Katherine Grace August, Matawan, NJ (US); Norman R. Shaer, Freehold, NJ (US); Theodore Sizer, II, Little Silver, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 557 days.

(21) Appl. No.: 09/503,096

(22) Filed: Feb. 11, 2000

(51) Int. Cl.
*H04L 9/00* (2006.01)

(52) U.S. Cl. .................... 713/176; 382/100; 348/563; 348/564

(58) Field of Classification Search ............. 382/100; 713/176; 380/28; 714/E19.009; 725/105, 725/110; 379/93.25; 348/563–564
See application file for complete search history.

(56) References Cited

U.S. PATENT DOCUMENTS

| | | | |
|---|---|---|---|
| 4,591,906 A | | 5/1986 | Morales-Garza et al. |
| 4,807,031 A | | 2/1989 | Broughton et al. |
| 5,138,649 A | | 8/1992 | Krisbergh et al. |
| 5,262,860 A | | 11/1993 | Fitzpatrick et al. |
| 5,327,554 A | | 7/1994 | Palazzi, III et al. |
| 5,343,239 A | | 8/1994 | Lappington et al. |
| 5,396,546 A | | 3/1995 | Remillard |
| 5,410,326 A | | 4/1995 | Goldstein |
| 5,523,794 A | | 6/1996 | Mankovitz et al. |
| 5,570,295 A | | 10/1996 | Isenberg et al. |
| 5,594,493 A | | 1/1997 | Nemirofsky |
| 5,663,766 A | | 9/1997 | Sizer, II |
| 5,671,267 A | | 9/1997 | August et al. |
| 5,822,432 A | * | 10/1998 | Moskowitz et al. ........... 380/28 |
| 5,929,920 A | | 7/1999 | Sizer, II |
| 6,108,406 A | * | 8/2000 | Mitchell et al. .......... 379/93.25 |
| 6,209,092 B1 | * | 3/2001 | Linnartz ..................... 713/176 |
| 6,216,228 B1 | * | 4/2001 | Chapman et al. ............ 713/176 |
| 6,233,684 B1 | * | 5/2001 | Stefik et al. ................. 713/176 |
| 6,314,192 B1 | * | 11/2001 | Chen et al. .................. 382/100 |
| 6,510,557 B1 | * | 1/2003 | Thrift ......................... 725/110 |
| 6,785,814 B1 | * | 8/2004 | Usami et al. ................ 713/176 |

* cited by examiner

*Primary Examiner*—Thanhnga B Truong

(57) ABSTRACT

An improved method and system for two way communications between multimedia providers and subscribers utilizes encryption technology for embedding a watermark containing specific data, or a pointer to specific data relating to a multimedia program in the principal program itself. The principal program may include, but is certainly not limited to a television broadcast, cable or satellite program, multimedia over the Internet, a paging service, or radio broadcast. The specific data may include web addresses, hyperlinks, telephone numbers, advertisements or any information related to the principal program. A decoder decodes the embedded data which may point to the related data stored in a database, or may include the related data. The related data is then delivered to the subscriber of the principal program through an appropriate medium, such ADSI, Internet, or radio. The subscriber receives the specific data, which may be delivered simultaneous with the delivery of the principal program, on an appropriate device, such as an ADSI enabled telephone, remote control or wireless telephone, or directly in a web browser. The specific data may also be available for retrieval at a later time. The decoding of the embedded data may occur at the subscriber's receiver, or preferably at a central location, such as the head end of a cable operator, satellite transmitter or Internet service provider.

34 Claims, 4 Drawing Sheets

METHOD AND SYSTEM FOR CAPTURE OF LOCATION SPECIFIC MEDIA RELATED INFORMATION AND DELIVERY THROUGH COMMUNICATIONS NETWORK

FIELD OF THE INVENTION

The present invention relates generally to a method for delivering to a subscriber through a communications network, specific data related to a video or audio program received by the subscriber. In one specific example a recipient of a television broadcast can receive web addresses or telephone numbers that relate to the broadcast. The web addresses can be sent through the Internet to the user's browser and the telephone numbers could be delivered to an ADSI telephone through an ADSI server.

BACKGROUND OF THE INVENTION

Various communication media exist for delivering content to subscribers. Many of these networks allow for two-way communication between the deliverer of the content and the subscriber. For example, cable television head-end systems provide two way transport of data between the cable head-end location and the home subscribing to the service. This architecture is used for applications such as pay-per-view, interactive television, subscription services and billing arrangements. Satellite broadcast companies also provide a two-way communications path between the transmission location and the subscriber home. The up-link path sometimes utilizes a telephone or modem. Another known architecture uses an FM radio signal to send secondary data corresponding to a television broadcast, into homes. Telephone or modems are used for the up-link.

While somewhat popular and useful, these architectures suffer from various limitations, especially with respect to delivering mixed media content. For example, two-way cable head-end equipment is expensive to deploy and functions only within a limited number of cable miles. In addition, specialized equipment is needed at the receiver's home, as well as a subscription(s) to the service.

Furthermore, advertisers and syndication companies may broadcast their content nationally, regionally, locally, or in other manners. The above architectures provide little in the way of target marketing based upon individual household composition, except by neighborhood or subscription. Some advertisers, especially those with a limited, local presence, may not be able to afford a subscription to interactive architectures.

U.S. Pat. No. 5,671,267, issued on Sep. 23, 1997 for "Interactive System for Communications Between a Cordless Telephone and a Remotely Operated Device" describes a handheld cordless telephone that is also able to remotely operate another electronic device, as well as be used as an interface to interact with other devices. It can mute television volume when an incoming call is detected. It can receive a telephone number relating to an advertisement and store it in memory for later retrieving and dialing. U.S. Pat. No. 5,671,267 is hereby incorporated as if fully set forth herein.

U.S. Pat. No. 5,929,920, issued on Jul. 27, 1999 for "System and Method for Encoding Digital Information in a Television Signal" relates to a method for encoding data into a video signal in a manner that does not interfere with the video signal but can be perceived by a photo-detector and thereby enabling recovery of the data. The energy of the encoded signal is added in a portion of the video signal that contains little energy so that a viewer of the video signal will not perceive the embedded signal. U.S. Pat. No. 5,929,920 is hereby incorporated as if fully set forth herein.

U.S. Pat. No. 5,570,295 issued on Oct. 29, 1996 to Isenberg and Tuomenoksa for "System and Method of Capturing Encoded Data Transmitted Over a Communications Network in a Video System" relates to data representing the telephone number of the service provider transmitted over a communications network that also carries a video signal. The data is captured by a telephony-capable component of the viewer's video system, illustratively a set-top box. The set-top box is connected to the telephone network so that information such as voice signals and data signals may be transmitted between the viewer's video system and the service provider. The set-top box may include an interface for a telephone or another communication device, such as a speaker phone, by which the viewer may communicate with the service provider. The communication device may also be directly integrated into the set-top box. U.S. Pat. No. 5,570,295 is hereby incorporated as if fully set forth herein.

SUMMARY OF THE INVENTION

The present invention enables delivery of specific data related to audio and/or video delivered through radio, cable, satellite and Internet, to specified households, pre-selected or mass distributed. The specific related data may be stored in a household device such as a screen-phone, or computer, for simultaneous, or delayed use by the subscriber. When used, the subscriber can participate in various services such as pay-per-view, automatic capture of internet related resources identifiers, including but not limited to uniform resource locators ("URL"), uniform resource names ("URN") world wide web and e-mail addresses, keywords and other resource identifiers employing various naming schemes, automatic capture of television numbers and interactive television, without requiring specialized decoders in the home. Consumers can "play along" with television on their computers. They can capture valuable coupons or offers, keep telephone numbers of important services and products, collect web addresses and bookmarks for simultaneous or later use, capture important information such as lottery numbers, and local community announcements and download programming data. All of the specific related data might be synchronized with, or orthogonal to a broadcast being viewed.

In one preferred embodiment of the present invention, specific related data encoded in audio or video media including broadcast, satellite, and cable is captured for all channels by region, area dominant influence, or other desired paradigm. The data is encoded in one of a number of ways including but not limited to the method described in U.S. Pat. No. 5,929,920, supra. The data is stored at a server connected via telephone, IP, or other communications network, to media viewers. The encoded content for a particular household may be based upon predetermined household specifications, subscription, survey, or geographic region. Alternatively, the encoded data may simply be related to the media content. Computer users or web TV users can "play along" with their favorite program, follow statistics of games while watching, or capture bookmarks, coupons and telephone numbers. Telephone users can capture web addresses, telephone numbers and electronic coupons using their telephone device.

The specific related data may also be programming data. This data may be used to control devices or perform an executable function. U.S. Pat. No. 5,671,267 discusses a remotely activating device which can receive programming data. This idea, can similarly be applied to the present invention.

One telephony system particularly suitable for use in accordance with the present invention is an Analog Display Services Interface ("ADSI") device. An ADSI server can communicate with one or more ADSI compatible screenphones to transmit and store telephone numbers or any resource identifier as defined above, captured from transmitted audio/video programs. These devices receive data from the ADSI network without requiring a specific user request. Accessories such as infrared remote controls or RF cordless telephone handsets with display can provide portable aspects of this architecture. The user will be able to learn about the specific related data being delivered without having to walk to the telephone or computer. As in the case of a radio broadcast the specific related data may be encoded imperceptibly in the broadcast. In addition, to any available means for video encoding, the specific related data into a video broadcast, audio encoding may also be used for television, IP, or other broadcast. This data may also be extracted in a centralized location, put into an internet application which sends the data by pager type function such as pager or pager feature in a PCS phone, to any wireless telephony system which includes pager features such as analog, digital, PCS and pager telephones. In this manner a person driving a car listening to the radio can receive the telephone numbers advertised automatically and have specific data then stored in a device such as a cellular telephone for immediate, or later use. Consumers can pre-select programming and enhanced content desired. Subscription and preference profiles could be used to indicate information to be sent, subscription and preferences.

Content and encoding can also be re-used. Databases need not be maintained or coordinated to provide an up-link. Decoders are not required in the home or car. Subscriptions are not required. Content delivered is not time sensitive as in cable interactive television models.

DETAILED DESCRIPTION OF THE INVENTION

Figure 1:
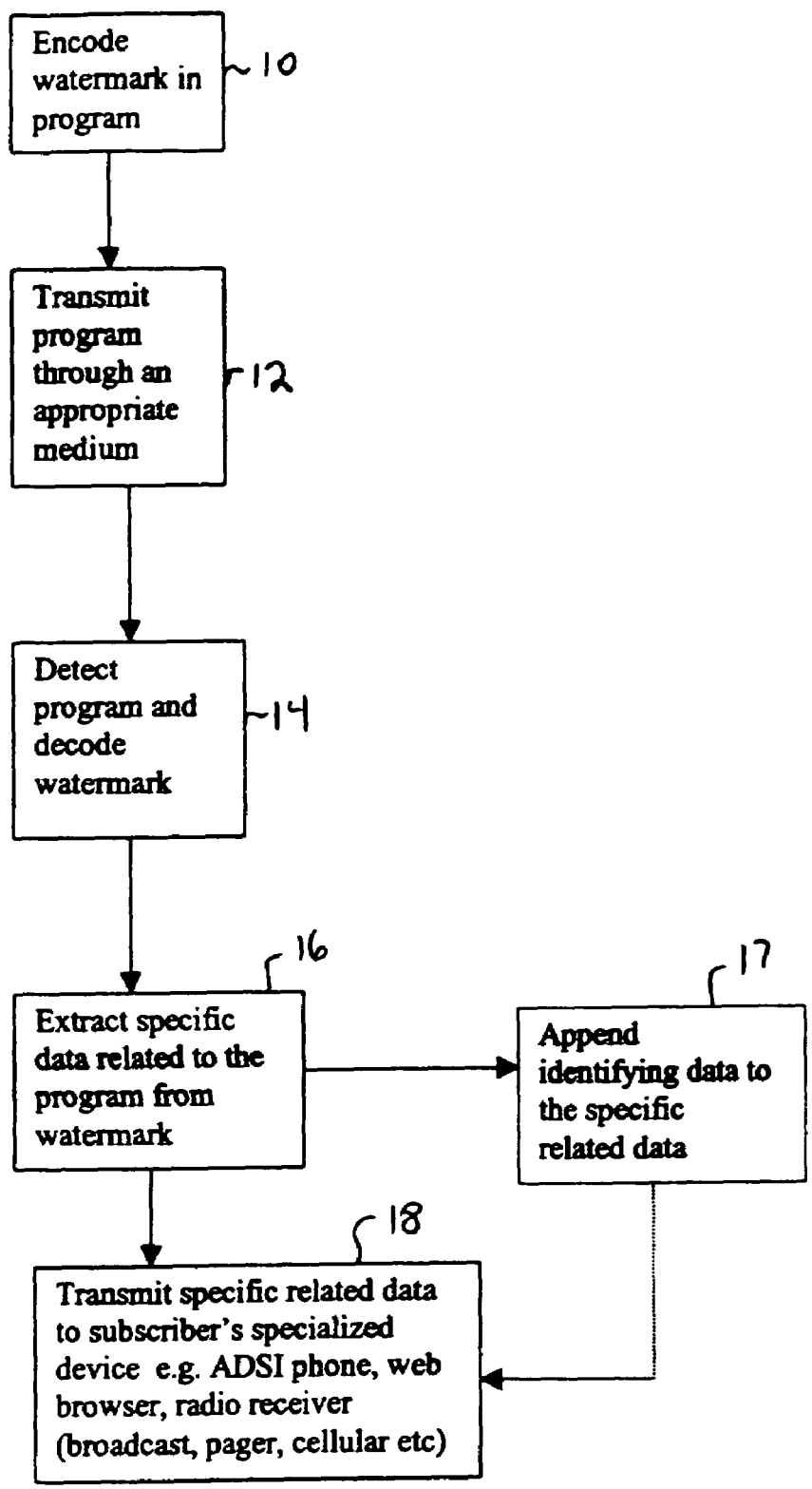
FIG. 1 is a flow chart of one embodiment of the method of the present invention

Referring to FIG. 1, the method of the present invention begins with embedding a watermark in a principal program, block 10. While it does not matter who embeds the watermark, this task may be performed by a content provider such as a producer, or owner of a television program. It may be performed by a broadcaster such as a TV or radio network station. It may even be performed by a re-broadcaster such as a cable operator.

The watermark is an electrical signal encoded within the signal of the transmitted program, but which is imperceptible to the human eye or ear. Various encoding schemes have been proposed in the art and may be used in accordance with the present invention. One such method for embedding an imperceptible watermark in a program is described in U.S. Pat. No. 5,929,920, entitled "System and Method for Encoding Digital Information in a Television Signal, to Theodore Sizer II and commonly assigned with the present invention, hereby incorporated by reference as if fully set forth herein. The '920 patent describes a method for adding a low level carrier signal or tone at a frequency in a video signal where little information is carried. Bands of such frequencies are described as appearing between comparatively large frequency components at the line rate and at the frame rate and their harmonics. One such frequency band is between 15 and 30 kHz.

In one described example of the invention of the '920 patent, the low level carrier signal is added at 25 kHz. The video image is not degraded, but a properly tuned decoder can receive and decode the encoded information. In this way, digital information can be imperceptibly inserted in a video signal by adding to the video signal an amplitude shift keyed (ASK) or frequency shift keyed (FSK) carrier signal, and the digital information can later be recovered using ASK or FSK decoding. Encoded data can also be inserted in a television signal and recovered by a receiver that responds to the picture displayed on the television, in the manner described in U.S. Pat. No. 4,807,031, hereby incorporated by reference as if fully set forth herein.

Furthermore, security features, such as encryption and key coding may be used where such features are needed for a particular application.

As described further below, one objective of the present invention is to transmit to one or more subscribers of the principal program, specific data related to the principal program. Thus the watermark may contain the actual specific related data, a portion of the data, or may simply include an identifier of the specific related data that is to be transmitted. An example of an identifier would be a pointer to a storage memory containing the specific related data.

One specific advantage of using a pointer to the specific related data which is itself stored elsewhere, is flexibility with respect to the time sensitivity of the data. Since the specific related data is stored and thus may be maintained independent of the principal program, the specific related data that is actually transmitted to the user may contain the most current information even when it is not accessed until a time after the delivery of the principal program to the user.

Consider for example, specific related data which consists of an offer to purchase a product from a vendor. A first subscriber may not view the offer the same time the principal program is delivered to the home or car. Meanwhile, other subscribers may be placing purchase orders and depleting the vendor's inventory. If the specific related data was embedded in the principal program and not separately maintained, the first subscriber may place an order for an item no longer available. However, if the specific related data is separately stored and maintained, updated information may be sent to the first subscriber upon request, or automatically at any desirable time.

As used herein, specific related data refers to data that is related but ancillary to the principal program that is being transmitted a subscription package, user profile, or other arbitrary demographic. It includes data that the content provider, or others wish to deliver, but for which the subscriber did not necessarily intend to receive when tuning into the principal program. Thus for example, a principal program may be a news magazine television program and the specific related data may be the telephone number for a dial in poll. The specific related data might include a web address to the home page on which an online chat relating to the television program is being conducted, or an official web site of the principal program. The specific related data may even include electronic coupons that may be redeemed by a retailer while a consumer is shopping over the Internet.

The relationship between the specific data and the principal program may be as close as the same subject matter, i.e., directly related. For example, the specific data may be a toll free number to call to place an order for a product advertised on the principal program. However, the relationship may be even more distant, i.e. orthogonal to the provider program. For example, the specific data may merely include advertisements aimed at a demographic expected to be viewing the principal program, or a user group represented by an individual or household receiving the principal program.

As for the principal program, it may be a television or radio broadcast of a feature show, or advertisement, a page message, cellular channel, or multimedia over the Internet. Indeed it may be any content over any media in which an imperceptible watermark may be encoded. As used throughout this description and the subsequent claims, the term imperceptible refers to imperceptible to the human eye and/or ear.

Figure 4:
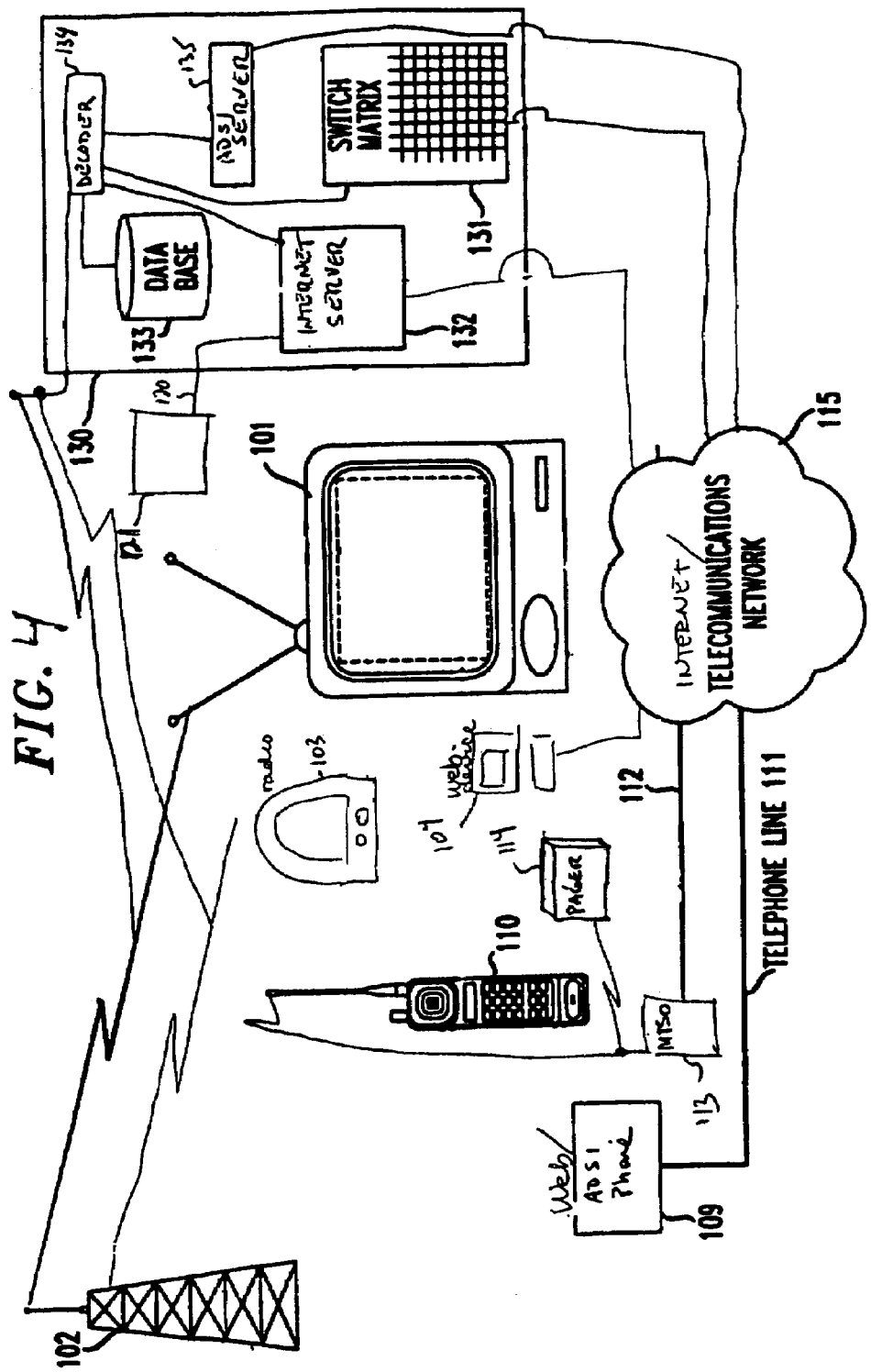
FIG. 4 illustrates one embodiment of a communications system in accordance with the present invention.

Referring back to FIG. 1, the principal program with the embedded watermark is transmitted through an appropriate medium, block 12. This medium may include, but is certainly not limited to satellite, cable, FM and AM radio, PCS, digital or analog telephony, other form of wireless communication, Internet backbone, or other network infrastructure. As shown in FIG. 4, the transmission of the principle program is through tower 102 to television receiver 101, or radio 103. The transmitted principal program with embedded watermark is detected at a receiver station 130 and a decoder 134 at the receiver station reads the content of the watermark, block 14. The receiver station may be tuned to receive the specific channel on which the principal program with embedded watermark is transmitted. Alternatively, the receiver station could be monitoring multiple channels for principal programs with embedded watermarks.

It is also possible for the receiver station to look for the embedded watermark by monitoring simulcast encoding techniques which use related multiple broadcast channels. This relates to programs which use FM to transmit encoded data on a frequency different from that of the primary program. In these applications, it is possible to deliver other features, such as the embedded watermark, in accordance with the present invention, over the same infrastructure. Where this is done, the receiver station would monitor these related channels for the watermark.

Figure 2:
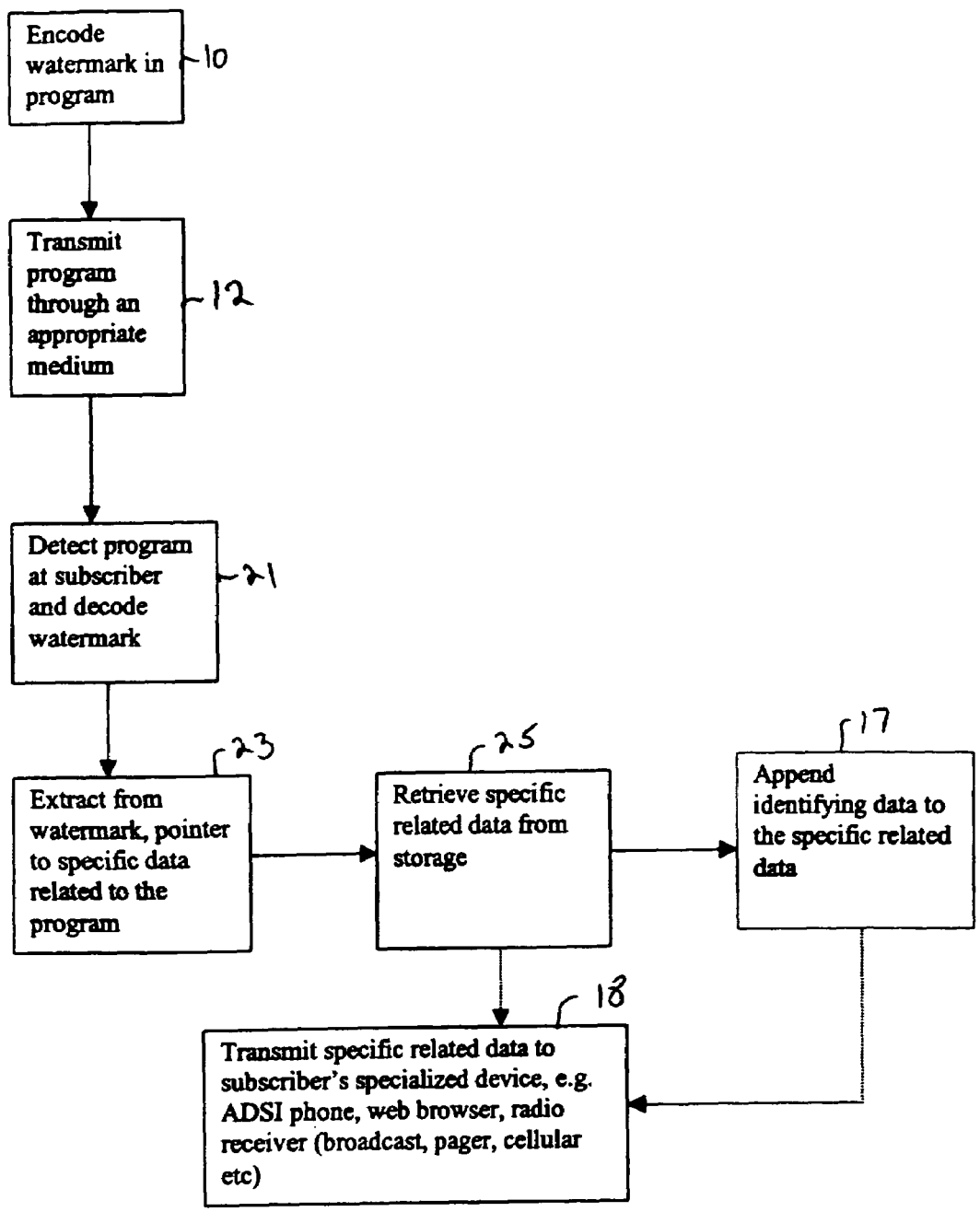
FIG. 2 is a flow chart of a second embodiment of the method of the present invention.
Figure 3:
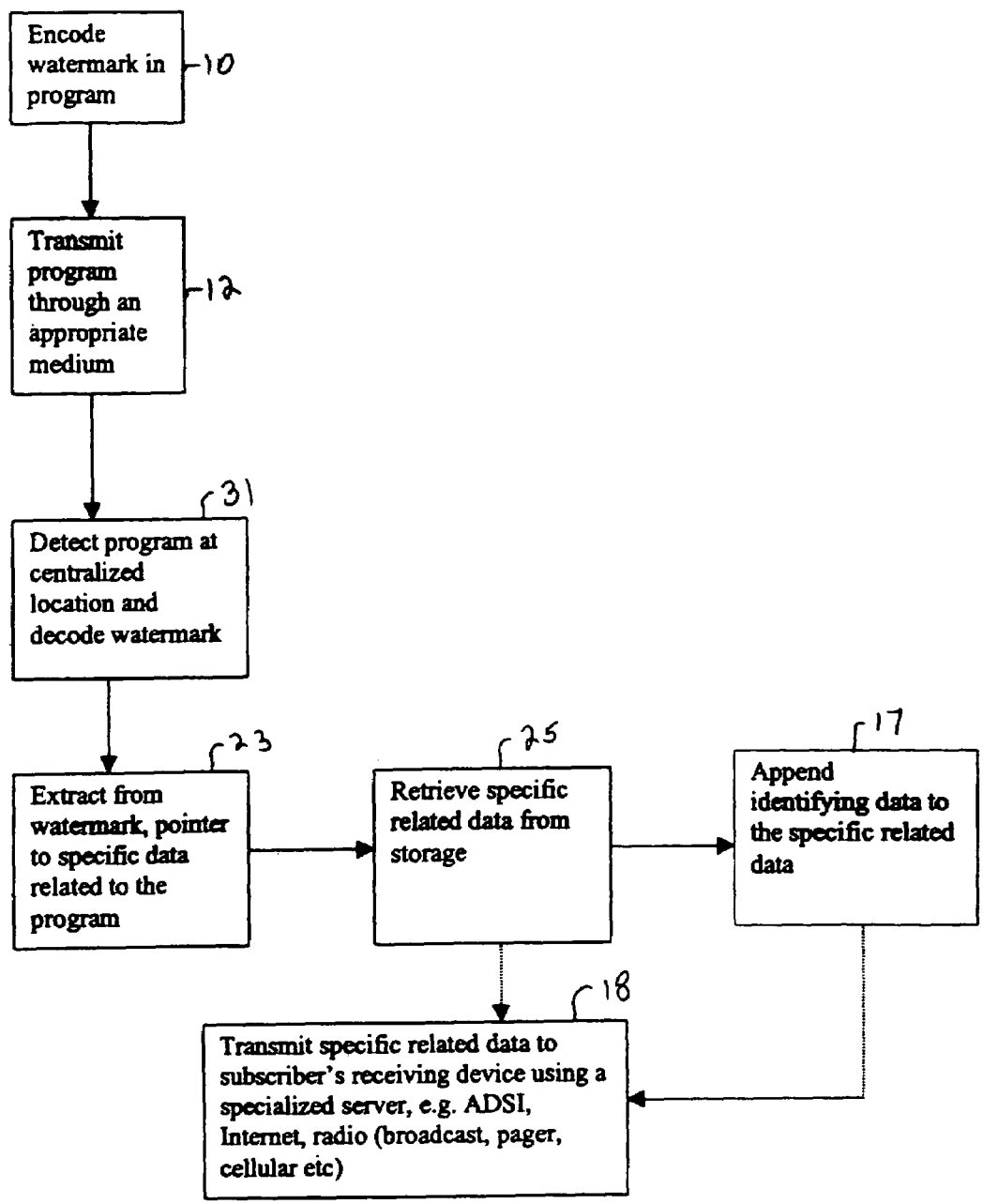
FIG. 3 is a flow chart of a third embodiment of the method of the present invention.

In one embodiment of the present invention the decoder is located at a location off site of a subscriber to the principal program. This is shown in FIG. 3 at block 31, as well as in FIG. 4, block 130. This location may be accessible to one or more subscribers and may also broadcast the specific related data to one or more subscribers. In an alternative embodiment, the decoder may be located at a subscriber's location, such as part of a set top box. This is shown by block 21 in FIG. 2.

Regardless of the location of the decoder, the decoder must extract the content of the watermark. As briefly stated above, the content may include the specific data related to the principal program, block 16, or a pointer to the specific related data stored elsewhere, block 23, such as database 133, shown in FIG. 4. Where the specific related data is stored elsewhere, it must first be retrieved, block 25. In this later embodiment the watermark may consist of specific data related to the video and/or audio transmitted program, a pointer to a storage medium containing specific data related to the transmitted program.

It should be noted that the receiver station might not necessarily be re-broadcasting the principal program. In other words, the operator of the receiver station may have no control over the transmission of the principal program. Rather the receiver station may be tuned to the same channel that the subscribers are tuned to and receiving the same content that the subscribers receive, the same time it is received by the subscribers. The key function of the receiver station is to decode the watermark and transmit the specific related data.

Notwithstanding the above, the present invention does not preclude a situation where the receiver station may also be a re-broadcaster. In this embodiment, principal program is encoded with a watermark and broadcast to one or more re-broadcasters. The re-broadcasters receive the principal program and decode the watermark. They may then simultaneously, but separately re-transmit the principal program and the specific related data.

At this point, the specific related data may be transmitted directly to one or more subscribers to a device for receiving the specific related data, block 18. Alternatively, prior to transmission to the subscribers additional information may be appended to the specific related data. This additional information may include originating information such as the source of the specific data, or re-broadcaster and the time, date when the specific related data were transmitted and the channel or other identification of the principal program. Such information as the time of day and channel from which the viewer or platform (set top box, pc clock, server clock etc.) received the information, the delay from the onset of the advertisement to the time that the viewer decided to capture the telephone number, and even the viewer's demographic information may be provided. The advertiser is then able to use this information and more knowledgeably select advertising alternatives (for example, which channel or what time of day is most effective in gaining viewer responses). The service provider can also use this information as a way to effectively market the broadcast capabilities to reach target markets. The viewer becomes able to capture and make use of an "electronic coupons" as an incentive to respond to advertisements, which is also a benefit to the service provider and the advertiser. Unlike existing interactive television content, information can be embedded in advertisements or visual information inexpensively and without burdening the non-user of this technology.

With respect to the transmission of the specific related data, typically the type of data will dictate the means of transmission. For example, where a telephone number is to be transmitted as part of the specific related data the number may be transmitted by an ADSI server 135 over a network 115, such as a telecommunications network or the Internet to be received by a subscriber's ADSI or web enabled telephone 109 or other web device 104. Likewise a web address may be transmitted over the Internet 120 via an Internet server 132 to be activated by a subscriber's web enable device, such as a web browser on a personal computer 121, or a web enabled phone or PDA, or otherwise made accessible on a web server. Another embodiment may include specific related data sent over a private paging network, or through a switch matrix 131 to a mobile telephone switch office 113 for transmission to a wireless phone 110, or pager 114.

In one advantageous embodiment of the present invention, the principal program may be an advertisement broadcast on TV or radio and the specific data may be a telephone number or web address to a toll-free number to order the featured product. Indeed, both telephone number and web address may be transmitted to an appropriate receiving device.

It should be clear that the medium, or communications network on which the specific related data is delivered may be different from, or the same as the delivery medium of the audio or video content carrying the watermark. Thus content delivered over the Internet can include a watermark with an embedded web address. In this example, a user on the Internet, viewing a principal program may automatically receive a web address through their browser, ready to be clicked to take the user to an associated web site. This data can be decoded and displayed on a computer screen, or a remote device, as desired by the subscriber, or service provider. In general, a customer viewing a program on a channel, either through satellite, Internet, cable, broadcast, radio broadcast, paging or any communications network would also receive specific information on another device through another or the same medium. This includes a telephone number on an ADSI enabled telephone, or an e-mail or web site address on a listing, or in the user's browser.

As mentioned above, one embodiment of the present invention may place a decoder for the watermark at the user. However, in many instances this will not be preferred since it would be necessary to insure all users had compatible decoders. A more preferable embodiment would be to perform all decoding at a central location. The central location could push the data to everyone, to subscribers alone, or make it available on a web server. The use of a localized receiving station also allows for the transmission of specific related data on an appropriate medium, which may be different from the medium of transmission of the principal program. For example, ADSI, Internet etc.

Furthermore, by using a localized receiver station to transmit the specific related data, it is simpler to collect demographic information on the subscribers. As stated above, in one embodiment of the present invention, before transmitting the specific related data, it is possible to append additional originating data that can be useful in tracking who is responding to what kind of specific related data and when. It is also easier to target different regions with specific related data when it is transmitted by a localized receiver station, or special interest group receiver, since different receiver stations in different regions can transmit different data. This is not as easily available, if at all where the national broadcaster transmits the specific related data directly to each subscriber.

In addition, by relegating the task of transmitting the specific related data to a localized receiver station it is also easier to monitor that only subscribers receive the data. It is also easier to establish more complex subscriptions to the specific related data such that a subscriber can select the type of specific related data it would like to receive. Once the decoder reads the specific related data, the receiver station can access a subscriber database to determine which subscriber is to receive that data. Also, existing infrastructure can be used to transmit the supplemental information and provide service to new geographic areas.

Due to the ease of responding to advertisements and other information, viewers are likely to respond sooner and in greater numbers, thus making more use of the existing long distance telephone routing network. This reduces the necessity for viewers to remember telephone numbers and reduces the burden on advertisers to select telephone numbers which they feel are easy to remember. This is accomplished since the burden of remembering the numbers is allocated to the handset unit, which advantageously stores the numbers in memory for the viewer.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for delivering specific data related to a principal program, to one or more subscribers receiving said principal program, said method comprising:

embedding a watermark within said principal program, first transmitting said principal program with the embedded watermark to said one or more subscribers;

decoding, at a central location not in physical proximity to a principal program presentation device for said one or more subscribers, said embedded watermark to determine the specific related data to be transmitted to said one or more subscribers, the specific related data including at least one of an offer to said one or more subscribers, telephone number, World Wide Web address, coupon, and advertisement; and second transmitting, in response to said decoded watermark, said specific data related to said principal program from the central location to said one or more subscribers through a communications network.

2. The method of claim 1 wherein said decoding step further comprises the steps of:

receiving said principal program at the central location.

3. The method of claim 1, wherein the principal program presentation device is at least one of an audio device and a video device.

4. A method for delivering a principal program and specific data related to said principal program to one or more subscribers, said method comprising the steps of:

determining, at a central location not in physical proximity to a principal program presentation device for said one or more subscribers, whether said principal program includes an embedded watermark;

decoding, at the central location, said embedded watermark from said principal program; and transmitting, in response to said decoded watermark, said specific related data from the central location to said one or more subscribers through a communications network, the specific related data including at least one of an offer to said one or more subscribers, telephone number, World Wide Web address, coupon, and advertisement.

5. The method of claim 4 wherein said decoding step further comprises the steps of:

receiving said principal program at the central location; and in response to said decoded watermark, transmitting said specific data related to said principal program to a receiving device associated with said one or more subscribers through a communications network.

6. The method of claim 5 wherein said watermark includes a pointer to said specific related data stored in a database, further comprising the step of retrieving said specific data from said database prior to said transmitting step.

7. The method of claim 5 wherein said watermark comprises said specific related data.

8. The method of claim 4 wherein said central location is a re-broadcaster of said principal program to said one or more subscribers.

9. The method of claim 8 wherein said re-broadcaster is the head-end office of a cable provider.

10. The method of claim 8 wherein said re-broadcaster is a satellite broadcast transmitter station.

11. The method of claim 8 wherein said re-broadcaster is an Internet service provider.

12. The method of claim 5 further comprising the step of:

appending demographic data to said secondary specific related data prior to said transmitting step, wherein said transmitting said specific related data includes transmitting said demographic data.

13. The method of claim 4, wherein the principal program presentation device is at least one of an audio device and a video device.

14. A communications system for delivering specific data related to a principal program, to one or more subscribers receiving said principal program, comprising:
- a decoder for decoding a watermark embedded in a principal program at a central location not in physical proximity to a principal program presentation device for said one or more subscribers, wherein said watermark contains data from which said specific related data may be identified, the specific related data including at least one of an offer to said one or more subscribers, telephone number, World Wide Web address, coupon, and advertisement; and
- delivery means for delivering said specific data related to said principal program from the central location to a receiving device associated with said one or more subscribers in response to the decoded watermark.

15. A communications system for delivering specific data related to a principal program, to one or more subscribers receiving said principal program, comprising:
- a decoder for decoding a watermark embedded in a principal program at a central location not in physical proximity to a principal program presentation device for said one or more subscribers, wherein said specific related data is contained within said watermark, the specific related data including at least one of an offer to said one or more subscribers, telephone number, World Wide Web address, coupon, and advertisement; and
- delivery means for delivering said specific data related to said principal program from the central location to a receiving device associated with said one or more subscribers in response to the decoded watermark.

16. The system of claim 14 wherein said delivery means for delivering said specific related data in an ADSI server and said receiving device is an ADSI device.

17. The system of claim 14 wherein said delivery means for delivering said specific related data is an IP server and said receiving device is an Internet enabled application running on a web enabled device associated with said one or more subscribers.

18. The system of claim 14 wherein said delivery means for delivering said specific related data is a radio transmitter.

19. The system of claim 18 wherein said receiving device is an FM radio receiver.

20. The system of claim 18 wherein said receiving device is a wireless telephone.

21. The system of claim 18 wherein said receiving device is a pager.

22. The system of claim 18 wherein said receiving device is a remote control device.

23. The system of claim 14 wherein said delivery means for delivering said specific related data is a television broadcast transmitter.

24. The system of claim 14 wherein said delivery means for delivering said specific related data is a set top box.

25. The system of claim 14 further comprising:
- a transmitter for transmitting said principal program with said watermark embedded therein from a point of origin to a destination.

26. The system of claim 25 further comprising:
- delivery means for delivering said principal program to said one or more subscribers.

27. The system of claim 14, wherein the principal program presentation device is at least one of an audio device and a video device.

28. The system of claim 15, wherein the principal program presentation device is at least one of an audio device and a video device.

29. The system of claim 15 wherein said delivery means for delivering said specific related data in an ADSI server and said receiving device is an ADSI device.

30. The system of claim 15 wherein said delivery means for delivering said specific related data is an IP server and said receiving device is an Internet enabled application running on a web enabled device associated with said one or more subscribers.

31. The system of claim 15 wherein said delivery means for delivering said specific related data is a radio transmitter.

32. The system of claim 15 wherein said delivery means for delivering said specific related data is a television broadcast transmitter.

33. The system of claim 15 wherein said delivery means for delivering said specific related data is a set top box.

34. The system of claim 15 further comprising:
- a transmitter for transmitting said principal program with said watermark embedded therein from a point of origin to a destination.

* * * * *